US012044365B1

(12) United States Patent
Zou

(10) Patent No.: US 12,044,365 B1
(45) Date of Patent: Jul. 23, 2024

(54) LIGHT EMITTING DIODE (LED) LIGHT BULB AND STRING LIGHT USING LED LIGHT BULB

(71) Applicant: Sijun Zou, Meizhou (CN)

(72) Inventor: Sijun Zou, Meizhou (CN)

( * ) Notice: Subject to any disclaimer, the term of this patent is extended or adjusted under 35 U.S.C. 154(b) by 0 days.

(21) Appl. No.: 18/388,904

(22) Filed: Nov. 13, 2023

(30) Foreign Application Priority Data

Oct. 31, 2023 (CN) ......................... 202322935026.2

(51) Int. Cl.
*F21K 9/232* (2016.01)
*F21S 4/10* (2016.01)
*F21V 19/00* (2006.01)
*F21V 31/00* (2006.01)
*F21Y 103/10* (2016.01)
*F21Y 115/10* (2016.01)

(52) U.S. Cl.
CPC ................ *F21K 9/232* (2016.08); *F21S 4/10* (2016.01); *F21V 19/0015* (2013.01); *F21V 31/005* (2013.01); *F21Y 2103/10* (2016.08); *F21Y 2115/10* (2016.08)

(58) Field of Classification Search
CPC .......... F21S 4/10; F21K 9/238; F21V 31/005; F21V 19/0015
See application file for complete search history.

(56) References Cited

U.S. PATENT DOCUMENTS 11,635,173 B1 4/2023 Wang
2009/0080195 A1* 3/2009 Huang .................. F21V 31/005 362/267
2016/0010814 A1* 1/2016 Peng ..................... F21V 31/005 362/244

FOREIGN PATENT DOCUMENTS

CN 217635538 U 10/2022

* cited by examiner

*Primary Examiner* — Karabi Guharay

(57) ABSTRACT

Disclosed are a light emitting diode (LED) light bulb and a string light using the LED light bulb. The LED light bulb includes an LED surface mounted device (SMD) lamp bead, a transparent lamp housing, and a rubber core. A metal lead lamp foot is in SMD welding to each connecting terminal of the LED SMD lamp bead, a waterproof rubber matrix is encapsulated in the LED SMD lamp bead. The string light includes a power line, a male connector, a female connector, and a plurality of lamp holders, and each lamp holder is equipped with the LED light bulb. Through the above structural design, the LED bulb and the string light using the LED bulb respectively have the advantages of a novel structural design, a simple assembly process, and low preparation cost.

10 Claims, 9 Drawing Sheets

LIGHT EMITTING DIODE (LED) LIGHT BULB AND STRING LIGHT USING LED LIGHT BULB

CROSS-REFERENCE TO RELATED APPLICATIONS

This is a U. S. patent application which claims the priority and benefit of Chinese Patent Application Number 202322935026.2, filed on Oct. 31, 2023, the disclosure of which is incorporated herein by reference in its entirety.

FIELD OF TECHNOLOGY

The present invention relates to the technical field of string lights, and particularly relates to a light emitting diode (LED) light bulb and a string light using the LED light bulb.

BACKGROUND

To heighten the festive atmosphere or activity atmosphere, a string light is usually used for decoration. The string light includes lamp holders electrically connected in sequence through a power line, and each lamp holder is provided with a light bulb.

A Chinese utility model patent, entitled waterproof light bulb, with the Publication No. ZL 202221258087.9, and a US patent, entitled waterproof light bulb, with the Publication No. U.S. Ser. No. 11/635,173B1 disclose a waterproof light bulb which includes a lamp holder, a light bulb housing, a soft rubber lamp base, and a core column structure, where the core column structure is connected to the lamp holder and extends into the light bulb housing; the core column structure includes a first metal lead, an LED light bar, and a second metal lead electrically connected in sequence, the first metal lead and the second metal lead both are injection molded with the soft rubber lamp base to form integrated structures and are electrically connected to the lamp holder, respectively, and the soft rubber lamp base is in hermetical close fit with an inner side of an opening of the light bulb housing.

It is to be noted that as far as the above waterproof light bulb is concerned, as each metal lead is injection molded with the soft rubber lamp base to form the integrated structure, in a preparation process of the waterproof light bulb, an injection mold is needed for the core column structure; and different injection molds are needed for different types of core column structures, which will increase the preparation cost and cause a relatively complicated preparation process.

SUMMARY

To overcome defects in the prior art, an object of the present invention is to provide a light emitting diode (LED) light bulb which is novel in structural design, simple in assembly process, and low in preparation cost.

To overcome the defects in the prior art, another object of the present invention is to provide a string light which is novel in structural design, simple in assembly process, and low in preparation cost.

To achieve the above objects, the present invention is realized by the following technical solution:

A light emitting diode (LED) light bulb, including a light emitting light source, a transparent lamp housing, and a plurality of metal lead lamp feet, where the light emitting light source is an LED surface mounted device (SMD) lamp bead, a metal lead lamp foot is in SMD welding to each connecting terminal of the LED SMD lamp bead, and a waterproof rubber matrix is encapsulated in the LED SMD lamp bead;

the LED light bulb further includes a rubber core, where a rubber core mounting hole is formed in a core portion of the rubber core, an upper end portion of the transparent lamp housing is inserted into the rubber core mounting hole, and an upper end portion of the rubber core is provided with a lamp foot through hole facing the opening and connected to the rubber core mounting hole corresponding to each metal lead lamp foot; and the LED SMD lamp bead is located in the rubber core mounting hole, an upper end portion of each metal lead lamp foot passes through the corresponding lamp foot through hole from bottom to top, and a tail end portion of each metal lead lamp foot is bent downwards and leans against an outer wall of the rubber core.

The rubber core is provided with a lamp bead limiting and stopping portion extending vertically downwards at a top position of the rubber core mounting hole, and the lamp bead limiting and stopping portion and the rubber core are of an integrated structure; and the waterproof rubber matrix coated on a periphery of the LED SMD lamp bead leans against and is limited by a lower surface of the lamp bead limiting and stopping portion.

The upper end portion of the transparent lamp housing is provided with a clamping portion; and the clamping portion of the transparent lamp housing is embedded into the rubber core mounting hole, and an outer side wall of the clamping portion is in clamping fit with an inner wall of the rubber core mounting hole.

Two metal lead lamp feet are in SMD welding to the LED SMD lamp bead; or, three metal lead lamp feet are in SMD welding to the LED SMD lamp bead, and the LED SMD lamp bead is an LED lamp bead with a red-green-blue (RGB) function.

The outer wall of the rubber core is provided with a limiting shoulder portion.

A string light, including a power line, a male connector connected to an end portion of the power line, and a female connector connected to the other end portion of the power line, the power line being equipped with successively arranged lamp holders, where each lamp holder is equipped with the LED light bulb.

A core portion of the lamp holder is provided with a rubber core insertion hole opened downwards, the power line extends into the rubber corer insertion hole of the lamp holder and is electrically connected to a connecting terminal lug, and each metal lead lamp foot of the LED light bulb corresponds to one connecting terminal lug; and the upper end portion of the rubber core is inserted into the rubber core insertion hole of the lamp holder, and the portion of each metal lead lamp foot leaning against the outer wall of the rubber core is in contact and electrical conduction with the corresponding connecting terminal lug.

An upper end portion of the lamp holder is provided with a line slot, and the power line passes through the line slot and is clamped and fixed in the line slot.

An inner wall of the rubber core insertion hole is provided with a terminal lug slot corresponding to each connecting terminal lug, and each connecting terminal lug is positioned and clamped in the corresponding terminal lug slot.

Compared with the prior art, the present invention has the following specific beneficial effects:

1. The LED light bulb provided by the present invention is matched with the lamp holders in use, and the lamp holder is provided with the connecting terminal lug corresponding to each metal lead lamp foot; when the LED light bulb is assembled on the lamp holder, each metal lead lamp foot is in contact and electrical conduction with the corresponding connecting terminal lug, so it is convenient to assemble;
2. In a preparation process of the LED light bulb provided by the present invention, a step of SMD welding the metal lead lamp foot to the LED SMD lamp bead, a step of encapsulating the waterproof rubber matrix, a step of mounting the LED SMD lamp bead and bending the lamp foot, and a step of mounting the transparent lamp housing are performed in sequence; and the LED light bulb is simple in preparation and assembly process and low in preparation cost;
3. The LED light bulb provided by the present invention has the advantages of a novel structural design, a simple assembly process, and low preparation cost; and correspondingly, the string light provided by the present invention also has the advantages of a novel structural design, a simple assembly process, and low preparation cost.

BRIEF DESCRIPTION OF THE DRAWINGS

The present invention will be further described below by means of the drawings, but the embodiments in the drawings do not limit the present invention by any means.

In FIGS. 1-9,

1—transparent lamp housing; 11—clamping portion; 2—metal lead lamp foot; 3—LED SMD lamp bead; 4—waterproof rubber matrix; 5—rubber core; 51—rubber core mounting hole; 52—lamp foot through hole; 53—lamp bead limiting and stopping portion; 54—limiting shoulder portion; 6—power line; 71—male connector; 72—female connector; 8—lamp holder; 81—rubber core insertion hole; 82—line slot; 83—terminal lug slot; 9—connecting terminal lug.

DESCRIPTION OF THE EMBODIMENTS

The present invention is described below in combination with specific implementation modes.

Figure 1:
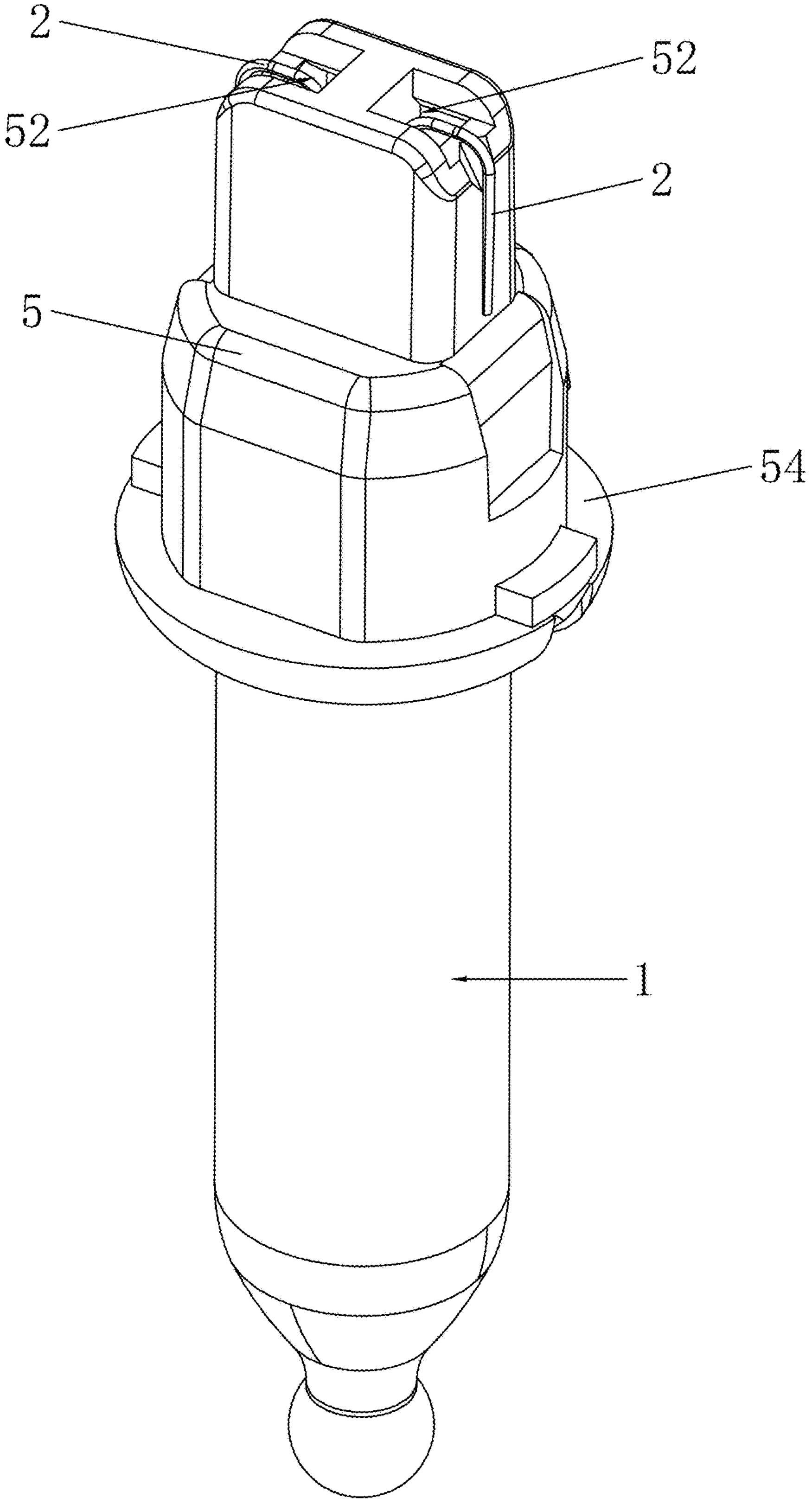
FIG. 1 is a structural schematic diagram of a first embodiment of an LED light bulb provided by the present invention.
Figure 2:
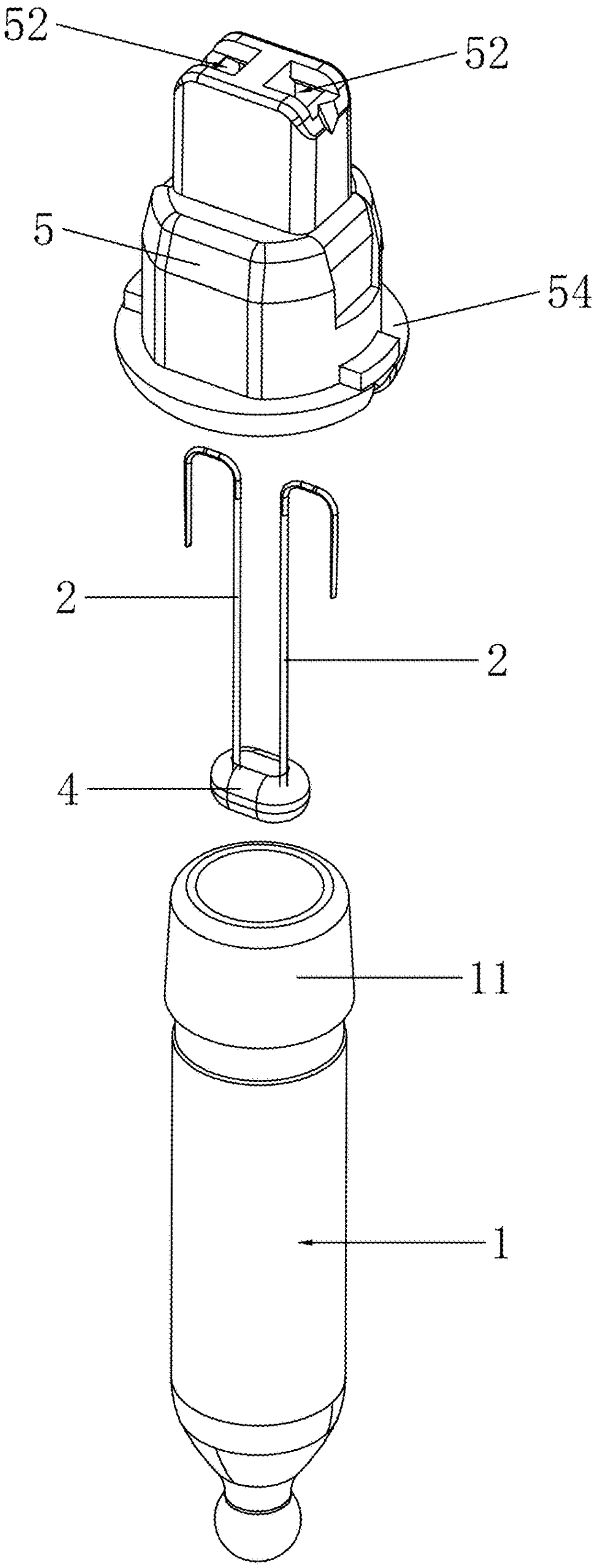
FIG. 2 is an exploded view of FIG. 1.
Figure 3:
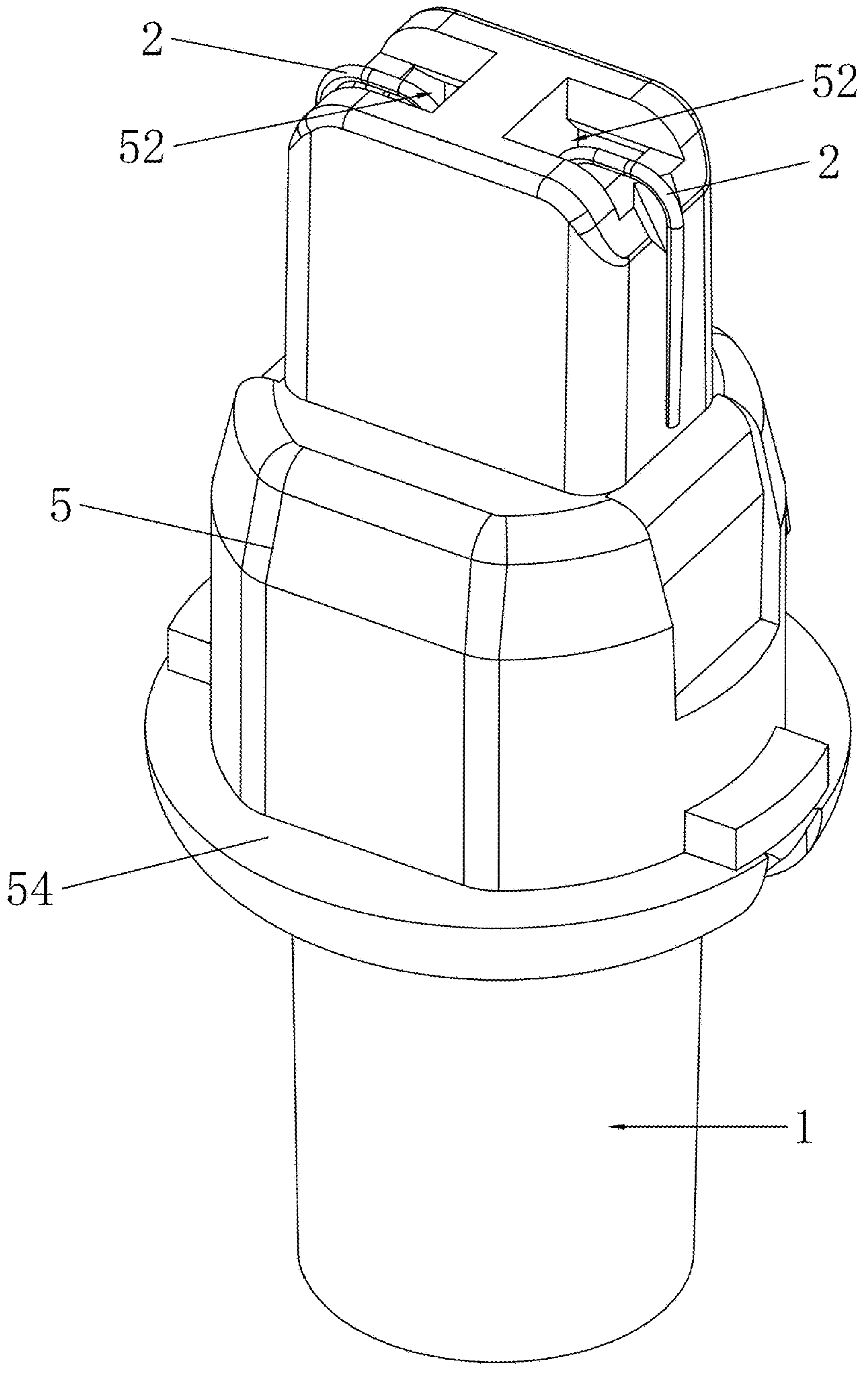
FIG. 3 is a structural schematic diagram of a second embodiment of the LED light bulb provided by the present invention.
Figure 4:
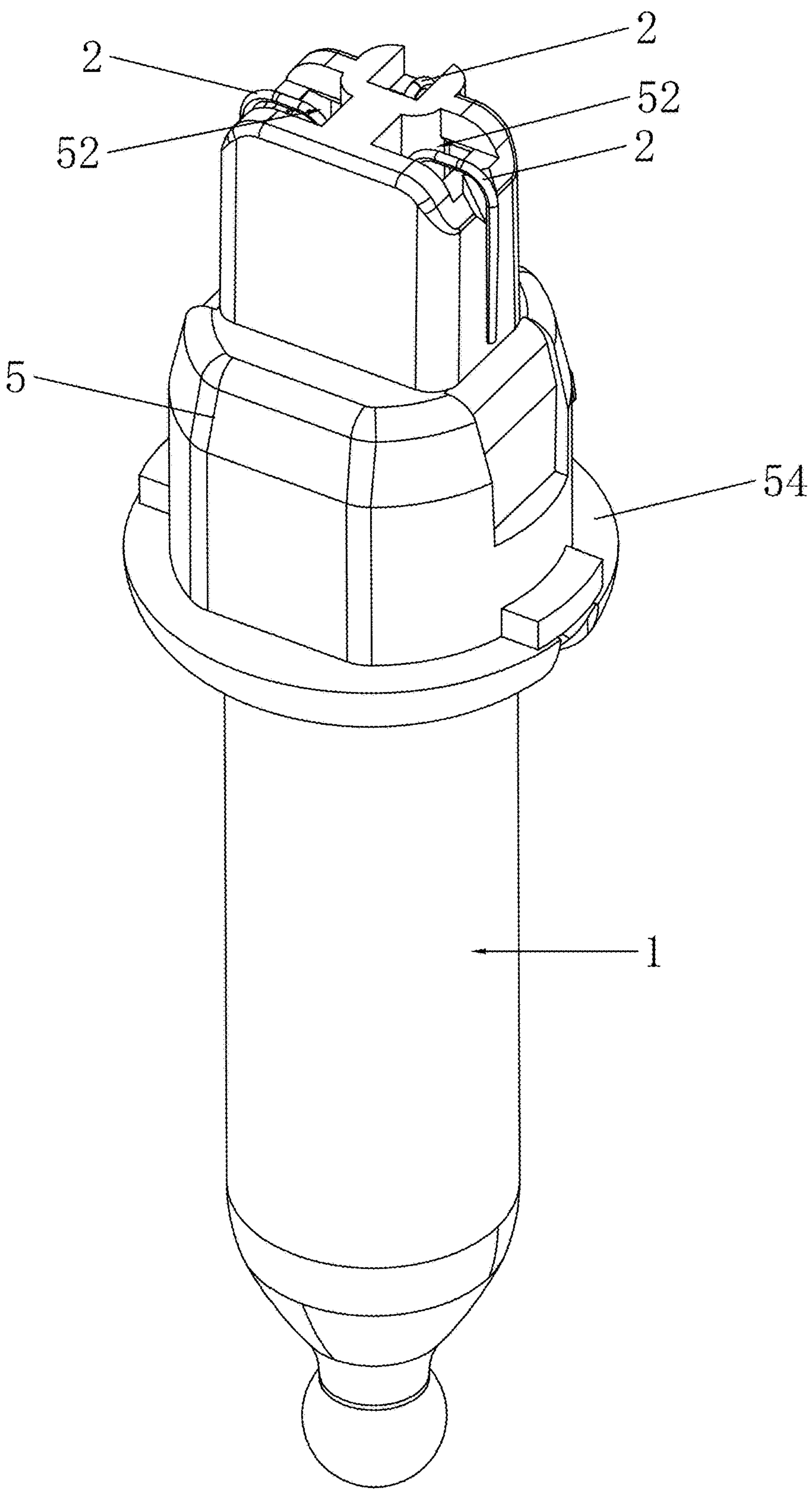
FIG. 4 is a structural schematic diagram of a third embodiment of the LED light bulb provided by the present invention.
Figure 5:
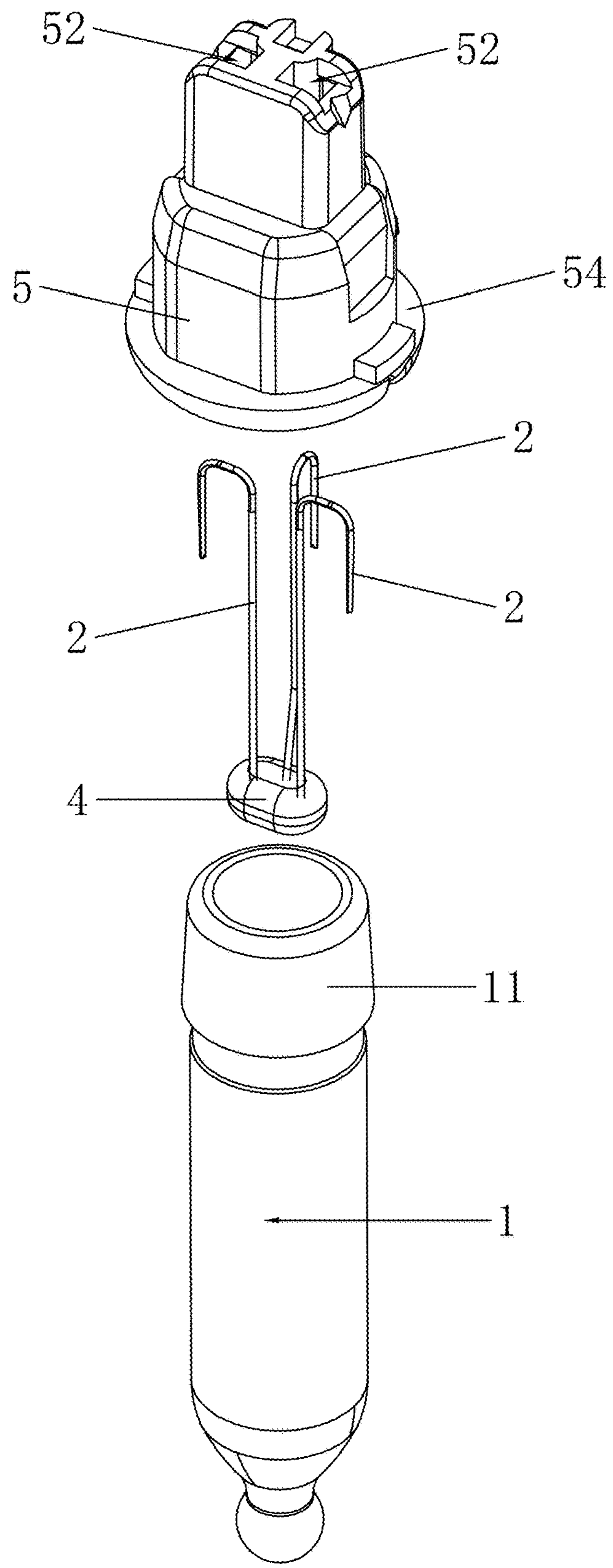
FIG. 5 is an exploded view of FIG. 4.
Figure 8:
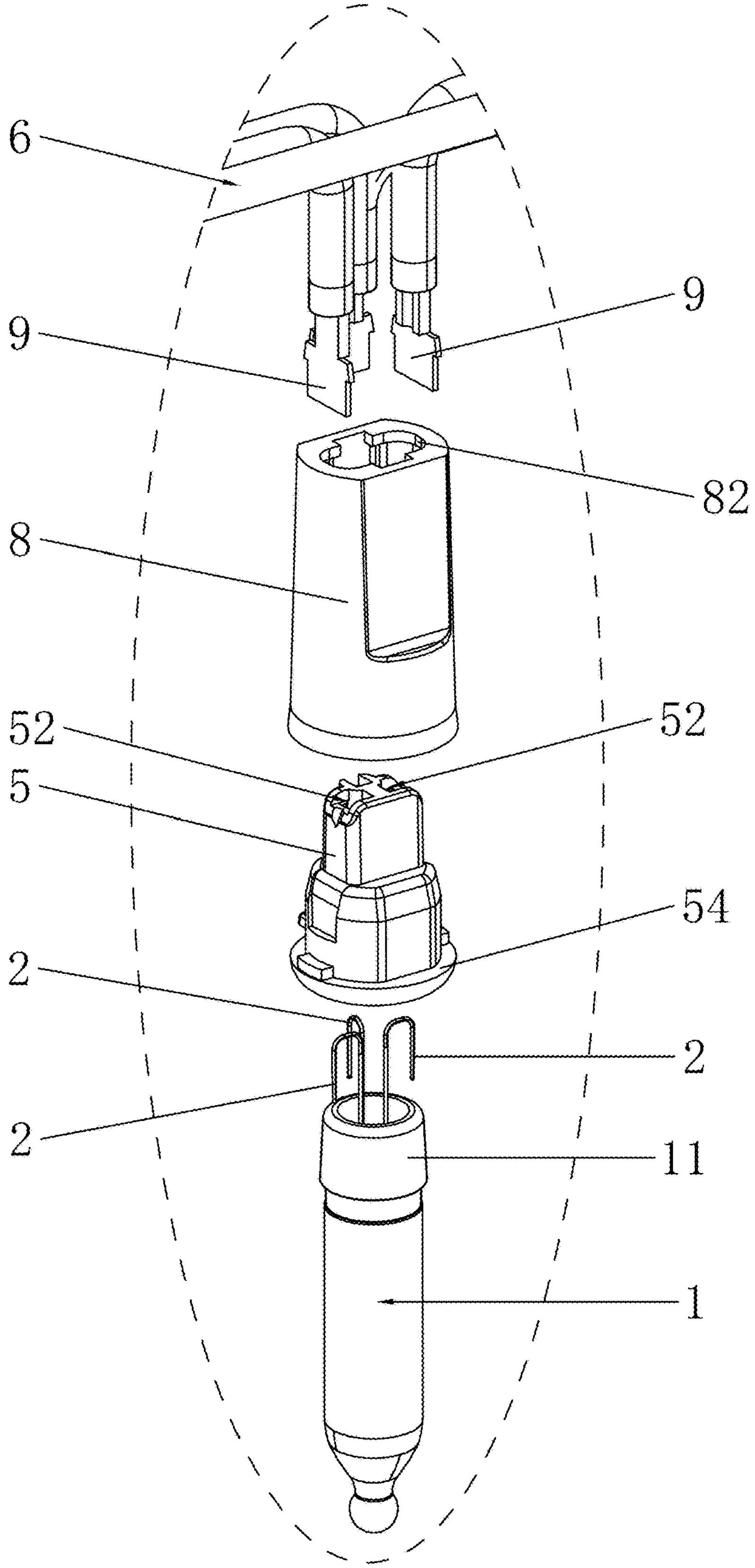
FIG. 8 is a partial enlarged drawing of FIG. 7.

Embodiment I: as shown in FIGS. 1-5, a light emitting diode (LED) light bulb, including a light emitting light source, a transparent lamp housing 1, and a plurality of metal lead lamp feet 2, where the light emitting light source is an LED SMD lamp bead 3, a metal lead lamp foot 2 is in SMD welding to each connecting terminal of the LED SMD lamp bead 3, and a waterproof rubber matrix 4 is encapsulated in the LED SMD lamp bead 3. As shown in FIGS. 1-3, two metal lead lamp feet 2 are in SMD welding to the LED SMD lamp bead 3; or, as shown in FIG. 4, FIG. 5, and FIG. 8, there metal lead lamp feet 2 are in SMD welding to the LED SMD lamp bead 3, and in this case, the LED SMD lamp bead 3 is an LED lamp bead with a red-green-blue (RGB) function.

Further, the LED light bulb further includes a rubber core 5, where a rubber core mounting hole 51 is formed in a core portion of the rubber core 5, an upper end portion of the transparent lamp housing 1 is inserted into the rubber core mounting hole 51, and an upper end portion of the rubber core 5 is provided with a lamp foot through hole 52 facing the opening and connected to the rubber core mounting hole 51 corresponding to each metal lead lamp foot 2.

Further, the LED SMD lamp bead 3 is located in the rubber core mounting hole 51, an upper end portion of each metal lead lamp foot 2 passes through the corresponding lamp foot through hole 52 from bottom to top, and a tail end portion of each metal lead lamp foot 2 is bent downwards and leans against an outer wall of the rubber core 5.

It is to be noted that the LED light bulb in the embodiment I is matched with the light bulb 8 in use, and the lamp holder 8 is provided with a connecting terminal lug 9 corresponding to each metal lead lamp foot 2. In a process of mounting the LED light bulb in the embodiment I in the lamp holder 8, each metal lead lamp foot 2 is in contact and electrical conduction with the corresponding connecting terminal lug 9, so it is convenient to assemble.

Figure 6:
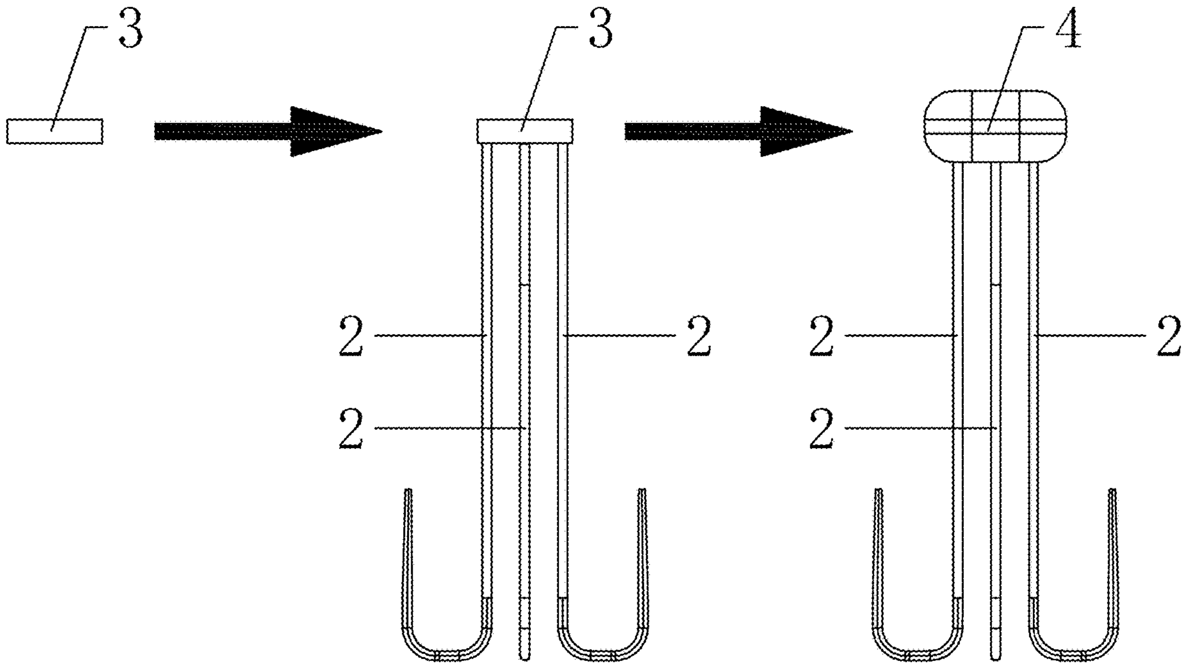
FIG. 6 is a flowchart where a lamp foot is in SMD welding to an LED SMD lamp bead and a waterproof rubber matrix is formed.

In addition, as far as the LED light bulb in the embodiment I is concerned, in its preparation process, as shown in FIG. 6, a metal lead lamp foot 2 is in SMD welding to each connecting terminal of the LED SMD lamp bead 3 first, and then the waterproof rubber matrix 4 is formed at the periphery of the LED SMD lamp bead 3 by way of dispensing encapsulation; after the metal lead lamp foot 2 is subjected to SMD welding and the waterproof rubber matrix 4 is formed, the LED SMD lamp bead 3 is put in the rubber core mounting hole 51 of the rubber core 5 from bottom to top, each metal lead lamp foot 2 passes through the corresponding lamp foot through hole 52 of the rubber core 5, and then the tail end portion of each metal lead lamp foot 2 is bent and each metal lead lamp foot 2 leans against the outer wall of the rubber core 5; and after the metal lead lamp foot 2 is bent, the transparent lamp housing 1 is embedded into the rubber core mounting hole 51 of the rubber core 5 to accomplish the LED light bulb assembly step.

In conclusion, compared with the prior art, the LED light bulb in the embodiment I has the advantages of a novel structural design, a simple assembly process, and low preparation cost.

Figure 9:
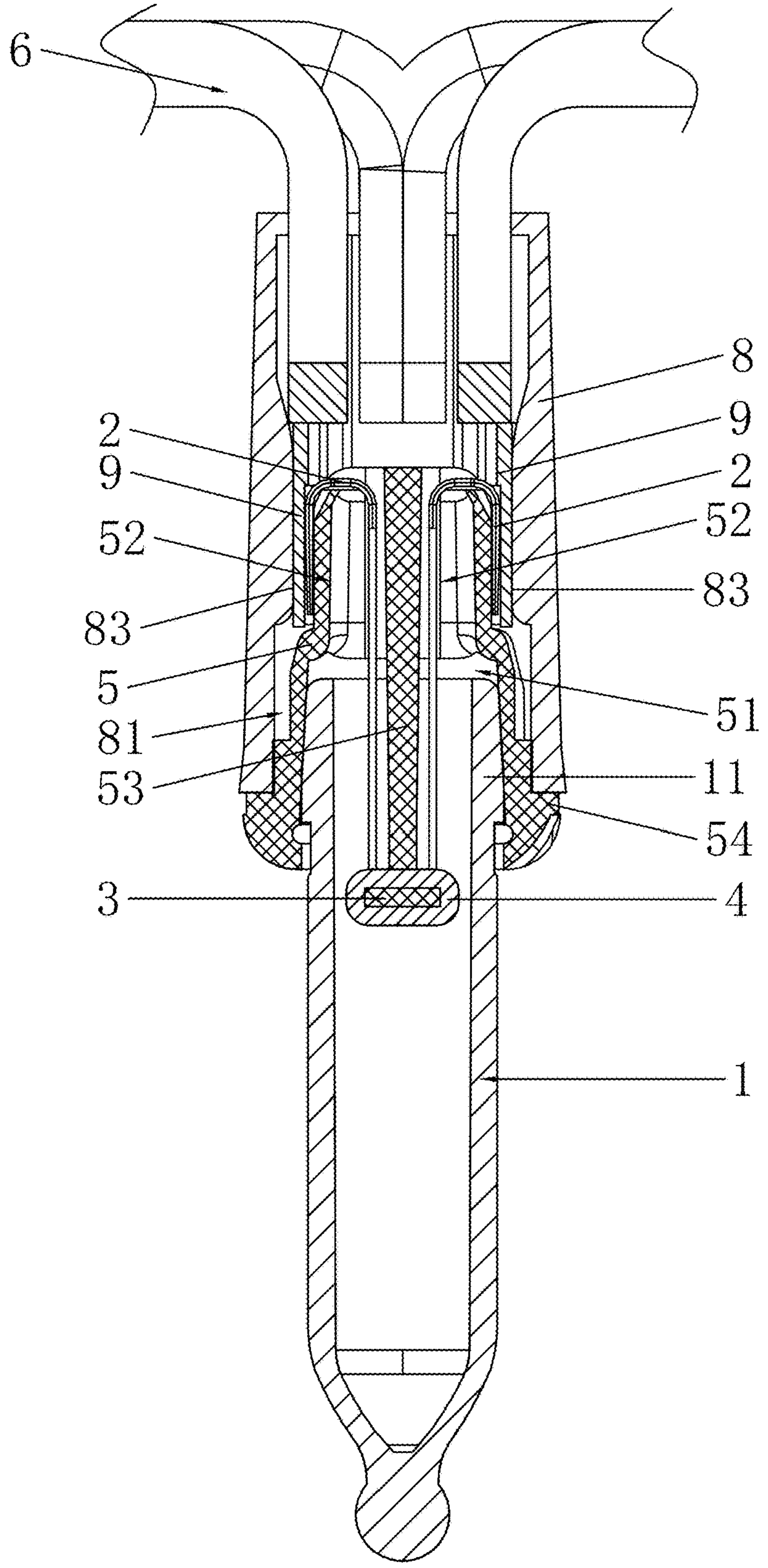
FIG. 9 is a schematic diagram of a partial section of the string light provided by the present invention.

Embodiment II: as shown in FIG. 9, the difference between the embodiment II and the embodiment I lies in that the rubber core 5 is provided with a lamp bead limiting and stopping portion 53 extending vertically downwards at the top of the rubber core mounting hole 51, and the lamp bead limiting and stopping portion 53 and the rubber core 5 are of an integrated structure; and the waterproof rubber matrix 4 coated on the periphery of the LED SMD lamp bead 3 leans against the lower surface of the lamp bead limiting and stopping portion 53.

By additionally arranging the structure of the lamp bead limiting and stopping portion 53, when the LED SMD lamp bead 3 is mounted in the rubber core mounting hole 51 of the rubber core 5, the lamp bead limiting and stopping portion 53 can block and limit the LED SMD lamp bead 3, so that the assembly convenience is improved.

Embodiment III: as shown in FIG. 2, FIG. 5, FIG. 8, and FIG. 9, the difference between the embodiment III and the embodiment I lies in that an upper end portion of the transparent lamp housing 1 is provided with a clamping portion 11; the clamping portion 11 of the transparent lamp housing 1 is embedded into the rubber core mounting hole 51, and an outer side wall of the clamping portion 11 is in clamping fit with an inner wall of the rubber core mounting hole 51.

It is to be explained that with respect to the above cone-shaped structural design, the embodiment III can effectively improve the stable reliability of inserting connection between the transparent lamp housing 1 and the rubber core 5, and also can effectively guarantee the hermetic waterproof performance of the connection therebetween.

Embodiment IV: as shown in FIGS. 1-5, the difference between the embodiment IV and the embodiment I lies in that the outer wall of the rubber core 5 is provided with a limiting shoulder portion 54. As far as the limiting shoulder portion 54 on the outer wall of the rubber core 5 is concerned, when the rubber core 5 is inserted into the corresponding lamp holder, the limiting shoulder portion 54 can play an inserting and limiting role to guarantee that the rubber core 5 can be accurately inserted into and assembled with the lamp holder.

Figure 7:
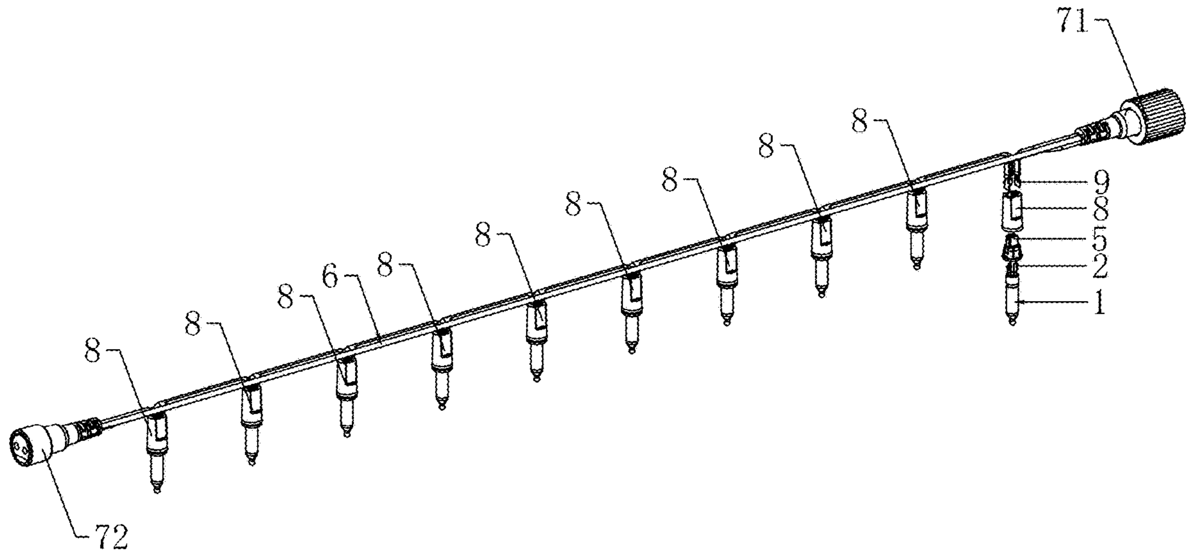
FIG. 7 is a schematic structural diagram of a string light provided by the present invention.

Embodiment V: as shown in FIGS. 7-9, a string light, including a power line 6, a male connector 71 connected to an end portion of the power line 6, and a female connector 72 connected to the other end portion of the power line 6, the power line 6 being equipped with successively arranged lamp holders 8, where each lamp holder 8 is equipped with the LED light bulb.

Specifically, a core portion of the lamp holder 8 is provided with a rubber core insertion hole 81 opened downwards, the power line 6 extends into the rubber corer insertion hole 81 of the lamp holder 8 and is electrically connected to a connecting terminal lug 9, and each metal lead lamp foot 2 of the LED light bulb corresponds to one connecting terminal lug 9; and the upper end portion of the rubber core 5 is inserted into the rubber core insertion hole 81 of the lamp holder 8, and the portion of each metal lead lamp foot 2 leaning against the outer wall of the rubber core 5 is in contact and electrical conduction with the corresponding connecting terminal lug 9.

It is to be noted that the LED light bulb has the advantages of a novel structural design, a simple assembly process, and low preparation cost; and correspondingly, the string light in the embodiment V also has the advantages of a novel structural design, a simple assembly process, and low preparation cost.

Embodiment VI: as shown in FIG. 8, the difference between the embodiment VI and the embodiment V lies in that an upper end portion of the lamp holder 8 is provided with a line slot 82, and the power line 6 passes through the line slot 82 and is clamped and fixed in the line slot 82. By arranging the structure of the line slot 82, the embodiment VI can effectively improve the stable reliability of the connection between the lamp holder 8 and the power line 6.

Embodiment VII: as shown in FIG. 9, the difference between the embodiment VII and the embodiment VI lies in that an inner wall of the rubber core insertion hole 81 is provided with a terminal lug slot 83 corresponding to each connecting terminal lug 9, and each connecting terminal lug 9 is positioned and clamped in the corresponding terminal lug slot 83.

In an assembly process of the embodiment VII, each connecting terminal lug 9 is embedded and limited in the corresponding terminal lug slot 83, so that each connecting terminal lug 9 is accurately positioned and mounted.

The above mentioned is only the preferred embodiments of the present invention. For those of ordinary skill in the art, variations will be made in specific embodiments and application range in terms of concept of the present invention. The content in the description shall not be construed as limitations to the present invention.

What is claimed is:

1. A light emitting diode (LED) light bulb, comprising a light emitting light source, a transparent lamp housing, and a plurality of metal lead lamp feet, wherein the light emitting light source is an LED surface mounted device (SMD) lamp bead, a metal lead lamp foot is in SMD welding to each connecting terminal of the LED SMD lamp bead, and a waterproof rubber matrix is encapsulated in the LED SMD lamp bead;

the LED light bulb further comprises a rubber core, wherein a rubber core mounting hole is formed in a core portion of the rubber core, the transparent lamp housing is of a cavity structure with an opening in one end and an upper end portion of the transparent lamp housing is inserted into the rubber core mounting hole, and an upper end portion of the rubber core is provided with a lamp foot through hole facing the opening and connected to the rubber core mounting hole corresponding to each metal lead lamp foot; and the LED SMD lamp bead is located in the rubber core mounting hole or an inner cavity of the transparent lamp housing, and each metal lead lamp foot passes through the corresponding lamp foot through hole and leans against an outer wall of the rubber core.

2. The LED light bulb according to claim 1, wherein the metal lead lamp foot is of a bent structure, and a bent end portion of the metal lead lamp foot passes through the lamp foot through hole and leans against the outer wall of the rubber core.

3. The LED light bulb according to claim 1, wherein the rubber core is provided with a lamp bead limiting and stopping portion extending vertically downwards at a top position of the rubber core mounting hole, and the lamp bead limiting and stopping portion and the rubber core are of an integrated structure; and the waterproof rubber matrix coated on a periphery of the LED SMD lamp bead leans against a lower surface of the lamp bead limiting and stopping portion.

4. The LED light bulb according to claim 1, wherein the upper end portion of the transparent lamp housing is provided with a clamping portion; and the clamping portion of the transparent lamp housing is embedded into the rubber core mounting hole, and an outer side wall of the clamping portion is in clamping fit with an inner wall of the rubber core mounting hole.

5. The LED light bulb according to claim 1, wherein at least two metal lead lamp feet are in SMD welding to the LED SMD lamp bead, and the LED SMD lamp bead is an LED lamp bead with a red-green-blue (RGB) function.

6. The LED light bulb according to claim 1, wherein the outer wall of the rubber core is provided with a limiting shoulder portion.

7. A string light, comprising a power line, a male connector connected to an end portion of the power line, and a female connector connected to the other end portion of the power line, the power line being equipped with successively arranged lamp holders, wherein each lamp holder is equipped with the LED light bulb according to any one of claims 1-6.

8. The string light according to claim 7, wherein a core portion of the lamp holder is provided with a rubber core insertion hole opened downwards, the power line extends into the rubber corer insertion hole of the lamp holder and is electrically connected to a connecting terminal lug, and each metal lead lamp foot of the LED light bulb corresponds to one connecting terminal lug; and the upper end portion of the rubber core is inserted into the rubber core insertion hole of the lamp holder, and the bent end portion of each metal lead lamp foot is electrically connected to the corresponding connecting terminal lug.

9. The string light according to claim 8, wherein an upper end portion of the lamp holder is provided with a line slot, and the power line passes through the line slot and is clamped and fixed in the line slot.

10. The string light according to claim 8, wherein an inner wall of the rubber core insertion hole is provided with a terminal lug slot corresponding to each connecting terminal lug, and each connecting terminal lug is positioned and clamped in the corresponding terminal lug slot.

* * * * *